(12) United States Patent
Kiiveri

(10) Patent No.: US 7,363,511 B2
(45) Date of Patent: *Apr. 22, 2008

(54) METHOD FOR PROCESSING AUDIOVISUAL INFORMATION IN AN ELECTRONIC DEVICE, A SYSTEM, AND AN ELECTRONIC DEVICE

(75) Inventor: Antti Kiiveri, Oulu (FI)

(73) Assignee: Nokia Corporation, Espoo (FI)

( * ) Notice: Subject to any disclaimer, the term of this patent is extended or adjusted under 35 U.S.C. 154(b) by 690 days.

This patent is subject to a terminal disclaimer.

(21) Appl. No.: 10/187,211

(22) Filed: Jun. 27, 2002

(65) Prior Publication Data

US 2003/0005322 A1 Jan. 2, 2003

(30) Foreign Application Priority Data

Jun. 29, 2001 (FI) .................................. 20011401

(51) Int. Cl.
*G06F 12/14* (2006.01)

(52) U.S. Cl. .................................................... 713/193
(58) Field of Classification Search ................ 713/193
See application file for complete search history.

(56) References Cited

U.S. PATENT DOCUMENTS

| | | | | |
|---|---|---|---|---|
| 4,694,490 A | * | 9/1987 | Harvey et al. | 380/234 |
| 4,704,725 A | * | 11/1987 | Harvey et al. | 380/242 |
| 5,109,414 A | * | 4/1992 | Harvey et al. | 725/135 |
| 5,224,166 A | * | 6/1993 | Hartman, Jr. | 713/190 |
| 5,233,654 A | * | 8/1993 | Harvey et al. | 725/135 |
| 5,237,616 A | * | 8/1993 | Abraham et al. | 713/193 |
| 5,333,306 A | * | 7/1994 | Abe | 714/55 |
| 5,450,489 A | * | 9/1995 | Ostrover et al. | 705/51 |
| 5,497,241 A | * | 3/1996 | Ostrover et al. | 386/97 |
| 5,504,818 A | * | 4/1996 | Okano | 713/166 |
| 5,574,567 A | * | 11/1996 | Cookson et al. | 386/46 |
| 5,576,843 A | * | 11/1996 | Cookson et al. | 386/97 |
| 5,598,276 A | * | 1/1997 | Cookson et al. | 386/46 |
| 5,675,645 A | * | 10/1997 | Schwartz et al. | 713/187 |
| 5,796,828 A | * | 8/1998 | Tsukamoto et al. | 380/203 |
| 5,825,879 A | * | 10/1998 | Davis | 380/216 |
| 5,880,447 A | * | 3/1999 | Okada et al. | 235/380 |
| 5,887,243 A | * | 3/1999 | Harvey et al. | 725/136 |
| 5,966,442 A | * | 10/1999 | Sachdev | 380/212 |
| 5,970,228 A | * | 10/1999 | Nezu | 726/34 |
| 6,026,293 A | * | 2/2000 | Osborn | 455/411 |
| 6,044,157 A | * | 3/2000 | Uesaka et al. | 380/201 |
| 6,055,313 A | * | 4/2000 | Kurita et al. | 380/243 |
| 6,088,262 A | * | 7/2000 | Nasu | 365/185.04 |
| 6,169,890 B1 | * | 1/2001 | Vatanen | 455/406 |
| 6,185,305 B1 | * | 2/2001 | Reinold et al. | 380/42 |
| 6,226,618 B1 | * | 5/2001 | Downs et al. | 705/1 |
| 6,289,455 B1 | * | 9/2001 | Kocher et al. | 713/194 |
| 6,338,044 B1 | * | 1/2002 | Cook et al. | 705/14 |

(Continued)

Primary Examiner—Nasser Moazzami
Assistant Examiner—David Garcia Cervetti
(74) Attorney, Agent, or Firm—Ware, Fressola, Van Der Sluys & Adolphson, LLP

(57) ABSTRACT

A method for processing audiovisual information in an electronic device comprises at least one control block for controlling the operation of the electronic device, and a memory. The audiovisual information is encrypted. The control block is provided with a protected processing block, and part of the memory is available in said protected processing block only. The audiovisual information is decrypted in said protected processing block and transmitted from the protected processing block to means for presenting audiovisual information.

26 Claims, 3 Drawing Sheets

U.S. PATENT DOCUMENTS

| | | | |
|---|---|---|---|
| 6,374,040 B2 * | 4/2002 | Mizoguchi et al. | 386/125 |
| 6,389,403 B1 * | 5/2002 | Dorak, Jr. | 705/52 |
| 6,398,245 B1 * | 6/2002 | Gruse et al. | 280/228 |
| 6,411,772 B1 * | 6/2002 | Cookson et al. | 386/94 |
| 6,442,335 B1 * | 8/2002 | Cookson et al. | 386/97 |
| 6,449,719 B1 * | 9/2002 | Baker | 713/168 |
| 6,477,252 B1 * | 11/2002 | Faber et al. | 380/200 |
| 6,490,686 B1 * | 12/2002 | Wheeler | 726/27 |
| RE38,007 E * | 2/2003 | Tsukamoto et al. | 380/203 |
| 6,523,119 B2 * | 2/2003 | Pavlin et al. | 713/192 |
| 6,529,602 B1 * | 3/2003 | Walker et al. | 380/283 |
| 6,574,609 B1 * | 6/2003 | Downs et al. | 705/50 |
| 6,611,812 B2 * | 8/2003 | Hurtado et al. | 705/26 |
| 6,615,192 B1 * | 9/2003 | Tagawa et al. | 705/57 |
| 6,615,349 B1 * | 9/2003 | Hair | 713/165 |
| 6,640,305 B2 * | 10/2003 | Kocher et al. | 713/194 |
| 6,681,213 B2 * | 1/2004 | Fujimori | 705/57 |
| 6,697,944 B1 * | 2/2004 | Jones et al. | 713/168 |
| 6,740,803 B2 * | 5/2004 | Brinkman et al. | 84/609 |
| 6,772,340 B1 * | 8/2004 | Peinado et al. | 713/168 |
| 6,775,655 B1 * | 8/2004 | Peinado et al. | 705/59 |
| 6,791,904 B1 * | 9/2004 | Herron et al. | 368/13 |
| 6,816,596 B1 * | 11/2004 | Peinado et al. | 380/277 |
| 6,829,708 B1 * | 12/2004 | Peinado et al. | 713/156 |
| 6,834,110 B1 * | 12/2004 | Marconcini et al. | 380/239 |
| 6,837,430 B2 * | 1/2005 | Yamada | 235/435 |
| 6,842,604 B1 * | 1/2005 | Cook et al. | 455/3.06 |
| 6,845,450 B1 * | 1/2005 | Kobayashi et al. | 726/5 |
| 6,886,098 B1 * | 4/2005 | Benaloh | 713/193 |
| 6,891,951 B2 * | 5/2005 | Inoha et al. | 380/44 |
| 6,904,406 B2 * | 6/2005 | Yamaji | 704/501 |
| 6,917,923 B1 * | 7/2005 | Dimenstein | 705/51 |
| 6,937,814 B1 * | 8/2005 | Chasen | 386/46 |
| 6,938,269 B2 * | 8/2005 | Kajimoto | 725/93 |
| 6,948,073 B2 * | 9/2005 | England et al. | 380/201 |
| 6,956,949 B1 * | 10/2005 | Faber et al. | 380/200 |
| 6,959,090 B1 * | 10/2005 | Alve et al. | 380/277 |
| 7,043,021 B2 * | 5/2006 | Graunke et al. | 380/239 |
| 7,058,818 B2 * | 6/2006 | Dariel | 713/189 |
| 7,068,786 B1 * | 6/2006 | Graunke et al. | 380/44 |
| 7,120,250 B2 * | 10/2006 | Candelore | 380/200 |
| 2001/0003195 A1 * | 6/2001 | Kajimoto | 709/310 |
| 2001/0043798 A1 * | 11/2001 | Ko et al. | 386/95 |
| 2002/0006204 A1 * | 1/2002 | England et al. | 380/269 |
| 2002/0012432 A1 * | 1/2002 | England et al. | 380/231 |
| 2002/0056081 A1 * | 5/2002 | Morley et al. | 725/1 |
| 2002/0061185 A1 * | 5/2002 | Hirabayashi et al. | 386/94 |
| 2002/0069359 A1 * | 6/2002 | Watanabe | 713/176 |
| 2002/0099948 A1 * | 7/2002 | Kocher et al. | 713/194 |
| 2002/0169974 A1 * | 11/2002 | McKune | 713/200 |
| 2004/0117645 A1 * | 6/2004 | Okuda et al. | 713/193 |
| 2005/0031123 A1 * | 2/2005 | Ichinose et al. | 380/37 |
| 2005/0141011 A1 * | 6/2005 | Han et al. | 358/1.14 |
| 2005/0144466 A1 * | 6/2005 | Versteijlen et al. | 713/189 |

* cited by examiner

US 7,363,511 B2

METHOD FOR PROCESSING AUDIOVISUAL INFORMATION IN AN ELECTRONIC DEVICE, A SYSTEM, AND AN ELECTRONIC DEVICE

CROSS-REFERENCE TO RELATED APPLICATIONS

Priority is claimed from Finnish patent application No. 20011401 filed on Jun. 29, 2001.

FIELD OF THE INVENTION

The present invention relates to a method for processing audiovisual information in an electronic device which comprises at least one control block for controlling the operation of an electronic device and a memory. The invention also relates to a system for processing audiovisual information in an electronic device comprising at least one control block for controlling the operation of the electronic device, a memory, and means for presenting audiovisual information. The invention further relates to an electronic device comprising at least one control block for controlling the operation of the electronic device, a memory, and means for presenting audiovisual information.

BACKGROUND OF THE INVENTION

At present, mobile communication devices can be used to communicate with various databases, payment systems or the like. In such connections, the secure and reliable processing of data is significant, because e.g. in payment applications, the user can, for example, order and pay for products. Thus, the system must be so reliable that what the user sees, for example, on the display of the mobile communication device, really corresponds to what takes place in the system. However, it is now already possible to download programs from various data sources into mobile communication devices, wherein the user cannot be fully certain of the reliability of such programs. In some cases, such a program may modify the information visible on the display to such a format which does not correspond to the information entered in the mobile communication device and/or the information transmitted from the mobile communication device. It is thus possible that the user believes to have paid the price visible on the display for the product ordered by him/her, but the program has modified the user's payment instructions in such a way that the price has been higher or that the price paid for the product to the supplier has been correct but, in addition to the price charged for the product, for example, an extra sum has been transferred from the user's account e.g. to the account of the program provider. Another possibility of misuse in the above-presented order event is that the user believes that he/she enters the correct delivery address but the program in the mobile communication device replaces the delivery address with another address. Thus, the user will not receive the product although having paid for it. When using the mobile communication device, other situations may also occur in which the information visible on the display may be different from the information actually processed in the mobile communication device.

In mobile communication devices, portable sound reproduction devices, computers, etc., it is now possible to reproduce digital audio information. The copying of such audio information in digital format is relatively easy. In the copying, the sound quality remains substantially as good as the sound quality of the original recording. To make the copying more difficult, various copy protection methods have been developed, such as the recording of digital audio information in encrypted format. The reproduction of such a recording requires decryption. Thus, in connection with the purchase of the recording, the purchaser is given a decryption key which the user must enter in the sound reproducer before the recording can be listened to. Another possibility is that the decryption key is sent to the purchaser of the recording by mail, wherein the recording can be listened to. A problem with arrangements like this is, however, that it does not prevent the transmission of the decryption key with a copied recording.

It is known that information needed by the user or the device can be encrypted with one key, the encrypted information can be stored in the memory of the device, and it can be decrypted with another key. In asymmetric encryption, the key used in encryption is different from the key used in decryption. Correspondingly, in symmetric encryption, the key used in encryption is the same as the key used in decryption. In asymmetric encryption, these keys are normally called a public key and a personal key. The public key is intended for encryption and the personal key is intended for decryption. Although the public key may be commonly known, it can normally not be used to easily determine the personal key corresponding to the public key, wherein it is very difficult for an outsider to find out information encrypted with this public key. One example of a system based on the use of such a public key and a personal key is the PGP system (Pretty Good Privacy), in which the user encrypts the information to be transmitted with the public key of the receiver, and the receiver will then open the encrypted information with his/her own personal key. However, there are considerable drawbacks in the systems of prior art. The key strings required by sufficiently secure systems are so long that even their storage in a safe way may, depending on the storage technology used in each application, cause considerable costs. If the key string is too short, it will be relatively easy to break up with modern data processing equipment. This problem is particularly significant in portable data processing and communicating devices, in which the limited processing capacity also prevents the use of long keys.

SUMMARY OF THE INVENTION

It is an aim of the present invention to provide a method for processing audiovisual information in such a way that the electronic device is equipped with a protected processing block in which the processing of audiovisual information is arranged. The blocks operating in the protected processing block are arranged in the same integrated circuit, wherein the information to be processed cannot be accessed from the outside of the blocks operating in the protected processing block. The aim of such an arrangement is to make the unauthorized processing of information and the copying of unencrypted information impossible in practice. The invention is based on the idea that in the protected processing block in the electronic device, the processing of the audio means and the display is only allowed for the processor operating in said block. More precisely, the method according to the present invention is primarily characterized in that the audiovisual information is encrypted, that the control block is provided with a protected processing block, that a part of the memory is only available in said protected processing block, that the audiovisual information is decrypted in said protected processing block, and the audiovisual information is transmitted from the protected processing block to means for presenting audiovisual information. The system according to the present invention is primarily characterized in that the system comprises means for encrypting audiovisual information; that the electronic device is provided with a protected processing block; that the protected processing block comprises means for using a part of the memory only in said protected mode; means for decrypting audiovisual information; and that the electronic device comprises means for transmitting audiovisual information from the protected processing block to the means for presenting audiovisual information. The electronic device according to the present invention is primarily characterized in that the electronic device comprises means for processing encrypted audiovisual information, that the electronic device is provided with a protected processing block; that the protected processing block comprises means for using a part of the memory only in said protected mode; means for decrypting audiovisual information; and that the electronic device comprises means for transmitting audiovisual information from the protected processing block to the means for presenting audiovisual information.

The present invention shows remarkable advantages compared to solutions of prior art. The user can rely on the information visible on the display of the electronic device according to the invention, because the unauthorized modification of the visual information between the display and the processor which controls the display is difficult. In a corresponding manner, unencrypted audio information is only processed in the means belonging to the protected block, wherein the copying of the audio information in unencrypted format is not possible. Thus, no special arrangements will be required in the resale of recordings, because the decryption key is not transmitted to the purchaser of the recording. Furthermore, the replacement of a damaged recording with a new one is possible with the arrangement of the invention, because the recording will only function in a specific electronic device.

BRIEF DESCRIPTION OF THE DRAWINGS

In the following, the invention will be described in more detail with reference to the appended drawings, in which.

DETAILED DESCRIPTION OF THE INVENTION

Figure 1:
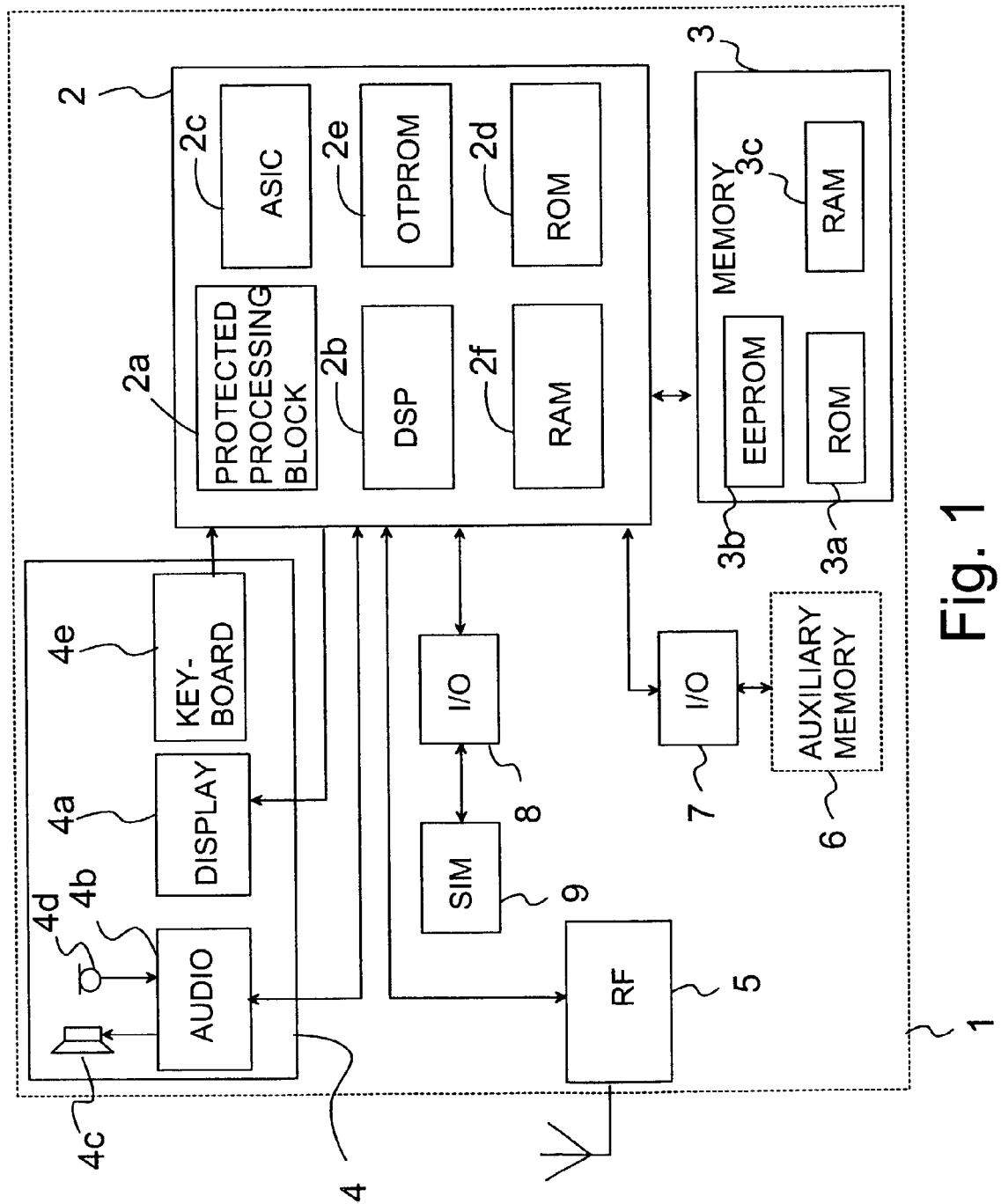
FIG. 1 shows an electronic device according to a preferred embodiment of the invention in a reduced block chart.

The invention can be applied in an electronic device 1, in which it is possible to process audiovisual information. Such electronic devices 1 include, for example, a mobile communication device, a computer, such as a personal computer (PC) or a portable computer, as well as sound reproducers which are only intended for sound reproduction. The electronic device 1 according to an advantageous embodiment of the invention, shown in FIG. 1, comprises at least a control block 2, memory means 3, and a user interface 4 which preferably comprises a display 4a and/or audio means 4b, 4c, 4d as well as a keyboard 4e. Furthermore, the electronic device of FIG. 1 comprises mobile communication means 5. The memory means 3 preferably comprise a read-only memory ROM and a random access memory RAM. At least a part of the read-only memory ROM is an electrically erasable programmable read-only memory EEPROM, such as a FLASH memory. The read-only memory ROM is used, for example, for storing program commands of the processor, for specific fixed setting data, or the like. It is also possible to connect an external memory card 6, such as a Flash memory card, to the electronic device. For this purpose, the electronic device is equipped with memory card connection means 7. For connecting a smart card, such as a SIM card 9, the electronic device 1 of FIG. 1 is also equipped with smart card connection means 8. A part of the memory can also be arranged in the control block 2. Furthermore, the control block 2 may comprise a digital signal processing unit 2b which is not necessarily the same as a digital signal processing unit 213 possibly belonging to the protected processing block 2a.

Figure 2:
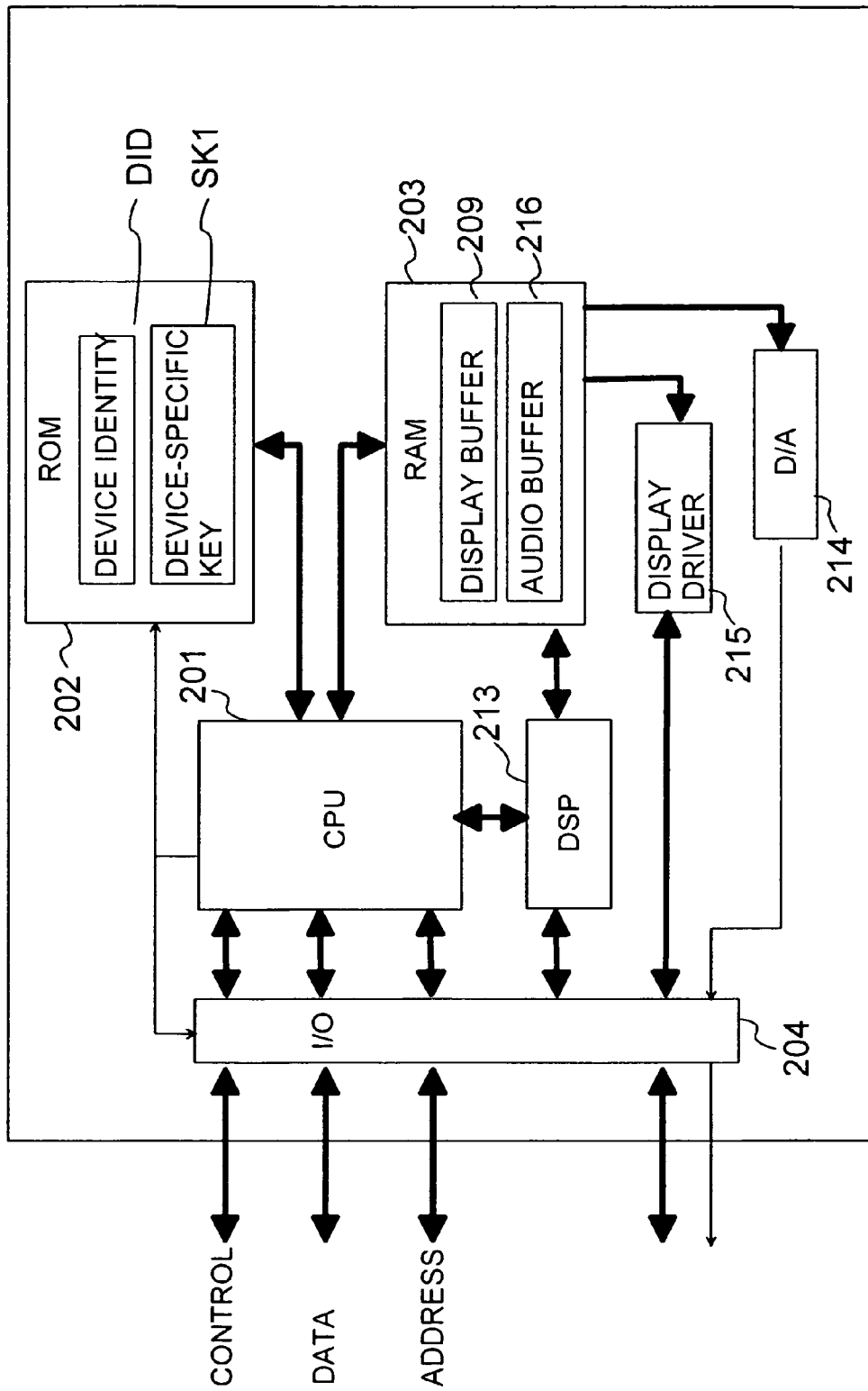
FIG. 2 shows the structure of the control block according to a preferred embodiment of the invention in a reduced manner.

FIG. 2 shows, in a reduced manner, the structure of the protected processing block 2a arranged in the control block 2 according to an advantageous embodiment of the invention. The protected processing block 2a comprises, for example, a processor 201 (central processing unit, CPU) and preferably also a digital signal processor (DSP) 213. The processor 201 can be arranged either as a separate processor, wherein the electronic device 1 has a processor (not shown) for controlling the operation of the electronic device 1, or the processor 201 may be implemented in such a way that the processor of the electronic device 1 is equipped with a protected mode for performing the operations according to the invention. The processor 201 is not limited to any particular processor but it may vary in different applications. The program code controlling the operation of the processor 201 can be partly stored in a read-only memory 202, which may be a one time programmable read-only memory (OTPROM) and/or a programmable read-only memory (e.g. an electrically erasable programmable read-only memory, EEPROM). In the read-only memory 202 is also stored a device-specific key SK1 to be used, in connection with the method according to the invention, for encryption functions and identification functions in a way described below in this description. The protected processing block 2a may also contain a random access memory 203. The protected processing block 2a is also provided with a digital-to-analog converter 214, in which an audio signal in digital format is converted to analog format. The digital-to-analog converter 214 is preferably implemented in the same circuit as the processor 201 or, if the protected mode is implemented in connection with the processor controlling the operation of the electronic device 1, the digital-to-analog converter 214 is preferably implemented in the same circuit as this processor. Thus, audio information cannot be recorded in unencrypted format. For presenting visual information, the protected processing block 2 is provided with a display driver 215, in which the information intended to be presented on the display 4a is converted to control signals of the display 4a. Furthermore, the protected processing block 2a contains a connection block 204, by means of which the protected processing block 2a can be connected to other functional blocks of the electronic device 1. In addition, by means of the connection block 204, the control signals to be led to the display 4a can be coupled, either from the digital signal processor 213 of the protected processing block 2a, from the processor 201, or from a block outside the protected processing block 2a, comprising means (not shown) for generating the signals required for controlling the display. In this advantageous embodiment of the invention, the protected processing block 2a and the other functional blocks 2b-2f of the control block 2 are presented as discrete blocks. However, it is obvious that at least part of said other functional blocks 2b-2f of the control block can be arranged as a single integrated block in connection with the protected processing block 2a.

Figure 3:
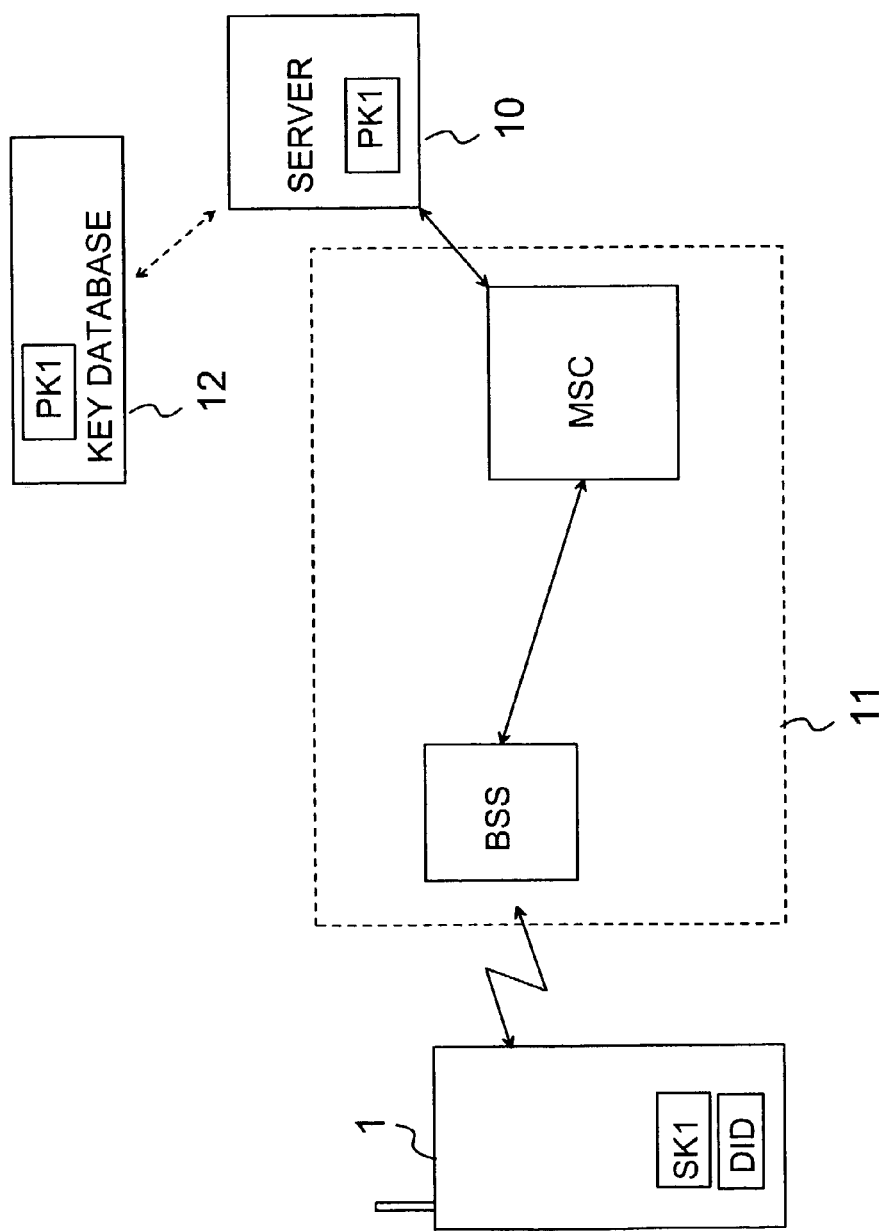
FIG. 3 shows the operation of the system according to a preferred embodiment of the invention in a reduced chart.

In the following, the operation of the method according to a preferred embodiment of the invention in the electronic device of FIG. 1 will be described with reference to the system shown in FIG. 3. It is assumed that the user starts, for example, a payment application, in which the user of the electronic device must be able to rely on the information to be presented on the display. Thus, the communication means, such as the mobile communication means 5, are used to set up a data transmission connection to the payment server 10 of a bank, preferably by means of a mobile communication network 11. The data transmission connection is preferably an encrypted connection in which preferably asymmetric encryption is employed. Upon setting up the connection, identification data is transmitted from the electronic device 1, to identify the electronic device. This identification data can be, for example, a device identity. If necessary, this identification data to be transmitted can be verified, for example, with a digital signature. In the electronic device 1, this is preferably performed by using the identification data and the device-specific key SK1. The payment server 10 checks the identification data by computing, on the basis of the public key corresponding to the identification data, reference data which should be identical to the digital signature transmitted in connection with the identification data. If the comparison shows that the electronic device 1 corresponds to the identification data, a connection can be set up. The information to be transmitted from the payment server 10 is encrypted with a public key PK1 corresponding to the device-specific key of the electronic device, which the payment server 10 can retrieve, for example, from a database 12 containing a storage of public keys.

In the electronic device 1, the encrypted information is received and led to the protected processing block 2a. In the protected processing block 2a, the processor 201 decrypts the data by using the device-specific key SK1. If necessary, the information is stored in unencrypted format in the random access memory 203 of the protected processing block. Preferably, this random access memory 203 is also provided with a display buffer 209, in which the information to be presented on the display 4a can be stored. The processor 201 transmits the content of the display buffer to the display driver 215 which forms, on the basis of this, control signals for changing the colour and/or brightness of pixels on the display 4a, if necessary. It is also possible that the display driver 215 can read the content of the display buffer, wherein the processor 201 does not need to transmit information directly to the display driver 215. In the electronic device according to an advantageous embodiment of the invention, encrypted information related to the display is processed in unencrypted format only within the protected processing block 2a; consequently, the programs running in the electronic device 1 cannot distort the information to be presented on the display. This improves the safe usage of the electronic device 1 compared with electronic devices 1 of prior art.

The invention can also be applied in such a way that, for displaying encrypted visual information, the display 4a is provided with a window in which this information is displayed. Thus, the processing block 201 controls the display driver in such a way that when the information contained in the window is updated, information is retrieved from the memory means 203 of the protected processing block 2a. By means of the connecting block 204, the processing block prevents that possible other functional blocks, located outside the protected processing block and controlling the display, cannot process the display driver 215 and/or the display 4a.

In the processing of audio information, it is possible to apply principles corresponding to those presented above, in connection with the displaying of visual information. For example, the user has stored music, which is in encrypted format, on a memory means, such as a Flash memory card. Thus, the music cannot be listened to without decryption. In the encryption of the audio information, a random symmetric key has been preferably used, encrypted with the public key PK1 of the device. Thus, the decryption is only possible by means of the random key opened with the device-specific key SK1 of the device. The processor 201 retrieves audio information from the Flash memory and decrypts it with the device-specific key SK1 and, if necessary, stores information in an audio buffer 216. After this, the decrypted audio information is transmitted to the digital-to-analog converter 214, in which the information is converted to analog format. This information, converted to analog format, can be transmitted outside the protected processing block, preferably to be amplified in an audio amplifier 4b and to be led to a speaker/an earpiece 4c.

The invention can also be applied by using two or more processors (not shown) instead of one processor 201. Thus, one processor 201 is primarily used in the protected processing block 2a, and the other processors are used in other functions. The other processors do not have access to the memory 202, 203 used by the processor operating in the protected processing block, nor to the control of the display driver 215 and/or the digital-to-analog converter 214 at the stage when encrypted information is processed in unencrypted format. The necessary communication between the processor 201 of the protected mode and the other processors can, in this embodiment, be arranged, for example, by means of a two-gate memory (not shown) or by determining, in the random access memory 2f, 3c, a memory space which can be processed by the processor of the protected mode and by at least one normal mode processor.

It is obvious that, for different uses, it is possible to store more than one device-specific key SK1 in the read-only memory 202 of the processing block 2a. On the other hand, one device-specific key SK1 stored in the read-only memory 202 of the processing block 2a can be used for encrypting several keys needed in the operation of the electronic device.

For digital signatures, several systems have been used, such as the RSA (Rivest, Shamir, Adleman), DSA (Digital Signatures Algorithm), and ECC (Elliptic Curve Cryptography). These systems use algorithms which compress the information to be signed, including SHA-1 (Secure Hash Algorithm) and MD5 (Message Digest 5) to be mentioned in this context.

At the stage of manufacture of the electronic device 1 according to the invention, and/or at the stage of updating the software, the required check-up data and programs are formed in the memory 2d, 2e, 3a, 3b preferably in the following way. The program codes required in the verifications are stored in the control block 2, including a boot program, a program for computing the digital signature, and encryption and decryption algorithm/algorithms. The manufacturer stores the device-specific key SK1 and possibly also the device identity DID in the read-only memory 202 of the processing block. At the stage of assembling the components (block 302), also the control block 2 is installed in the circuit card of the electronic device 1 (not shown). The manufacturer stores the other possible application programs, for example, in the programmable memory 3b and/or in the one time programmable memory 3a. After this, the electronic device 1 can be delivered to a dealer or a service provider, such as a mobile telephone operator. Furthermore, the manufacturer preferably transmits the public key related to the device-specific key in a database, from which public keys can be retrieved for use in different situations, when necessary.

The device-specific key SK1 can also be stored at another time than at the stage of manufacture of the electronic device. The device-specific key can be, for example, another key for encrypting the pair of keys intended for protecting this music or other content by encryption. Thus, the pair of keys to be used for protecting the content can be supplied to the electronic device later. In this embodiment, either a pair of keys (X) or a shared secret is determined between the electronic device and the manufacturer. By using these, it is possible to deliver a pair of keys (Y) to the electronic device 1 later, to be used for protecting the content according to the invention. Thus, the pair of keys to be used for protecting the content does not need to be ready in the electronic device 1.

In an advantageous embodiment of the invention, the public key (Yj) of the pair of keys (Y) is used to encrypt a symmetric key (k) formed by the content provider. The content is thus encrypted with the key (k), and the key (k) is protected with the key (Yj). When both the encrypted content and the key (k) are dispatched to the electronic device 1, the asymmetric algorithm is used with the device-specific key (Yh) of the electronic device to open the key (k) used in the encryption of the content. After this, the content can be opened with the encrypted key (k). Thus, an asymmetric algorithm is only used to open a small quantity of data, the rest being opened with a symmetric algorithm. Because a symmetric algorithm is even 1000 times faster than an asymmetric algorithm, a significant performance benefit can be achieved with this solution.

The encryption of information to be transmitted in encrypted format to the electronic device 1 is preferably performed at the stage of transmission, or at the stage when the information is stored on a storage means, such as said Flash memory card. At the stage of encryption, said public key PK1 must be determined.

It is obvious that the present invention is not limited solely to the above-presented embodiments, but it can be modified within the scope of the appended claims.

The invention claimed is:

1. A method for processing audiovisual information in an electronic device which comprises at least one control block for controlling the operation of an electronic device, and a memory, wherein the audiovisual information is encrypted, the method comprising:
   providing the control block with a protected processing block comprising an element for processing audiovisual information, wherein a part of the memory is only available in said protected processing block,
   providing the electronic device with at least a device-specific key, stored in said protected processing block, for decrypting the encrypted audiovisual information,
   decrypting the audiovisual information in said protected processing block, wherein processing of the element is only allowed by a processor of the protected processing block, and
   transmitting the audiovisual information from the protected processing block to a converter and driver for presenting audiovisual information.

2. The method according to claim 1, wherein in the electronic device, audiovisual information is processed in unencrypted format in said protected processing block only.

3. The method according to claim 1, wherein a public key is provided to correspond to said device-specific key, for encrypting audiovisual information intended to be presented in the electronic device.

4. The method according to claim 1, wherein said device-specific key is stored in the electronic device at the stage of manufacture of the electronic device.

5. The method according to claim 1, further comprising:
   forming at least said device-specific key and a corresponding public key;
   storing said device-specific key in the electronic device;
   forming a pair of keys comprising a first key to be used for encrypting audiovisual information and a second key to be used for decrypting audiovisual information encrypted with the first key;
   encrypting the second key of said pair of keys with said public key; and
   transmitting the encrypted second key of the pair of keys to the electronic device, in which the second key is decrypted with said secret key,
   wherein the audiovisual information is decrypted in the electronic device with said decrypted second key of the pair of keys.

6. The method according to claim 1, further comprising:
   forming at least said device-specific key and a corresponding public key;
   storing said device-specific key in the electronic device;
   forming an encryption key to be used for encrypting and decrypting audiovisual information;
   encrypting said encryption key with said public key; and
   transmitting the encrypted encryption key to the electronic device, in which the encryption key is decrypted with said device-specific key,
   wherein the audiovisual information is decrypted in the electronic device with said decrypted encryption key.

7. The method according to claim 1, wherein said protected processing block is provided with a digital-to-analog converter, by which the decrypted audio information is converted to an analog audio signal.

8. The method according to claim 1, wherein, outside said protected processing block, a digital-to-analog converter is provided, by which the decrypted audio information is arranged to be converted to an analog audio signal.

9. The method according to claim 1, wherein said protected processing block is provided with means for controlling the display, by which the decrypted visual information is converted to control signals for the display.

10. A system for processing audiovisual information in an electronic device comprising at least one control block for controlling the operation of the electronic device, a memory, and a converter and driver for presenting audiovisual information, wherein the system comprises means for encrypting audiovisual information;
   wherein the electronic device is provided with a protected processing block with a device-specific key stored in said protected processing block;
   wherein the protected processing block comprises means for using a part of the memory only in said protected processing block; means for decrypting audiovisual information in said protected processing block; a processor, and an element for processing audiovisual information, said element being only accessible to said processor, and
   wherein the electronic device comprises means for transmitting audiovisual information from the protected processing block to the means for presenting audiovisual information.

11. The system according to claim 10, wherein the electronic device comprises means for arranging audiovisual information to be processed in unencrypted format in said protected processing block only.

12. The system according to claim 10, wherein said device-specific key is configured to decrypt the encrypted audiovisual information.

13. The system according to claim 10, wherein the system comprises means for forming a public key corresponding to said device-specific key, whereby audiovisual information intended to be presented in the electronic device is arranged to be encrypted.

14. The system according to claim 10, wherein said device-specific key has been stored in the electronic device at the stage of manufacture of the electronic device.

15. The system according to claim 10 comprising: said device-specific key and a corresponding public key, and which device-specific key is stored in the electronic device; a pair of keys comprising a first key to be used for encryption of audiovisual information and a second key to be used for decrypting audiovisual information encrypted with the first key, means for encrypting the second key of said pair of keys with said public key, means for transmitting the encrypted second key of the pair of keys to the electronic device which comprises means for decrypting the second key with said secret key, and means for decrypting audiovisual information with said decrypted second key of the pair of keys.

16. The system according to claim 10 comprising: said device-specific key and a corresponding public key, and which device-specific key is stored in the electronic device; an encryption key to be used for the encryption of audiovisual information and for the decryption of encrypted audiovisual information, means for encrypting said encryption key with said public key, means for transmitting the encrypted encryption key to the electronic device which comprises means for decrypting the encryption key with said secret key, and means for decrypting audiovisual information with said decrypted encryption key.

17. The system according to claim 10, wherein said protected processing block comprises a digital-to-analog converter, by which the decrypted audio information is converted to an analog audio signal.

18. The system according to claim 10, wherein the electronic device comprises a digital-to-analog converter which is provided outside said protected processing block and by which the decrypted audio information is arranged to be converted to an analog audio signal.

19. The system according to claim 10, wherein said protected processing block comprises means for controlling the display, by which the decrypted audio information is converted to control signals for the display.

20. The system according to claim 10 comprising means for making payment transactions, and means for encrypting visual information related to the payment transaction to be transmitted to the electronic device.

21. An electronic device comprising:
at least one control block for controlling the operation of the electronic device,
a memory,
means for presenting audiovisual information,
means for processing encrypted audiovisual information,
a protected processing block; wherein the protected processing block comprises means for using a part of the memory only in said protected processing block; means for decrypting audiovisual information in said protected processing block; a processor, and an element for processing audiovisual information, said element being only accessible to said processor; and wherein a device-specific key is stored in the protected processing block, by which the encrypted audiovisual information is arranged to be decrypted; and
means for transmitting audiovisual information from the protected processing block to the means for presenting audiovisual information.

22. The electronic device according to claim 21, wherein said device-specific key is used for decrypting the key used for decrypting the encrypted audiovisual information.

23. An electronic device according to claim 21 comprising means for performing mobile station functions.

24. A method for processing audiovisual information in an electronic device which comprises at least one control block for controlling the operation of an electronic device, and a memory, said control block being provided with a protected processing block comprising an audiovisual information processing element, wherein the method comprises:
encrypting audiovisual information,
using a part of the memory only in said protected processing block,
providing the electronic device with at least a device-specific key, stored in said protected processing block, for decrypting the encrypted audiovisual information,
decrypting the encrypted audiovisual information in said protected processing block,
allowing only the processor to process the audiovisual information processing element; and
transmitting the audiovisual information from the protected processing block to said audiovisual information presenting element.

25. A method for processing encrypted audiovisual information in an electronic device which comprises at least one control block for controlling the operation of an electronic device, and a memory, said control block being provided with a protected processing block comprising an audiovisual information processing element, wherein the method comprises:
using a part of the memory only in said protected processing block,
providing the electronic device with at least a device-specific key, stored in said protected processing block, for decrypting the encrypted audiovisual information,
decrypting the encrypted audiovisual information in said protected processing block,
allowing only the processor to process the audiovisual information processing element; and
transmitting the audiovisual information from the protected processing block to said audiovisual information presenting element.

26. An electronic device comprising
at least one control block for controlling the operation of the electronic device,
a protected processing block;
a memory part which is only accessible in said protected processing block;
an audiovisual information presenting element; and
a transmitting element for transmitting decrypted audiovisual information from the protected processing block to the audiovisual information presenting element;
wherein said protected processing block comprises:
a processor;
a decrypting element for decrypting encrypted audiovisual information;
an audiovisual information processing element for processing decrypted audiovisual information the operation of which is only controlled by said processor, and
wherein a device-specific key is stored in the protected processing block, by which the encrypted audiovisual information is arranged to be decrypted.

* * * * *